US010164515B2

(12) United States Patent
Xu et al.

(10) Patent No.: US 10,164,515 B2
(45) Date of Patent: Dec. 25, 2018

(54) DRIVING METHOD FOR POWER SEMICONDUCTOR SWITCHES IN H-BRIDGE CIRCUIT (71) Applicant: Delta Electronics (Shanghai) Co., Ltd., Shanghai (CN)

(72) Inventors: Wei Xu, Shanghai (CN); Dingkun Shen, Shanghai (CN); Jianfei Zheng, Shanghai (CN); Jianping Ying, Shanghai (CN); Zhiming Hu, Shanghai (CN); Wei Tian, Shanghai (CN); Wei Xie, Shanghai (CN); Lan Wei, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/891,352

(22) Filed: Feb. 7, 2018

(65) Prior Publication Data
US 2018/0248467 A1    Aug. 30, 2018

(30) Foreign Application Priority Data

Feb. 27, 2017  (CN) .......................... 2017 1 0106945
Nov. 29, 2017  (CN) .......................... 2017 1 1224401

(51) Int. Cl.
H02P 8/28      (2006.01)
H03M 1/08      (2006.01)
H02M 1/08      (2006.01)
H02M 7/483     (2007.01)
H02M 1/00      (2006.01)

(52) U.S. Cl.
CPC .......... *H02M 1/083* (2013.01); *H02M 7/483* (2013.01); *H02M 2001/0058* (2013.01); *H02M 2007/4835* (2013.01)

(58) Field of Classification Search
CPC ..................... H02M 1/083; H02M 2001/0058
USPC ......................................... 327/109
See application file for complete search history.

(56) References Cited

U.S. PATENT DOCUMENTS 6,356,048 B1 *  3/2002  Zenoni ................. D03D 47/361
                                              318/139
6,940,243 B2 *  9/2005  Berroth ................... H02P 6/085
                                              318/400.29
9,154,044 B2 * 10/2015  Choi ....................... G01R 31/028

* cited by examiner

*Primary Examiner* — Dinh T Le
(74) *Attorney, Agent, or Firm* — CKC & Partners Co., Ltd.

(57) ABSTRACT

A driving method for power semiconductor switches in an H-bridge circuit is provided. The method includes: calculating a start time and an end time of a zero level of an output voltage and determining a zero level section based on the start time and end time of the zero level; and driving an upper power semiconductor switch of a first bridge arm and an upper power semiconductor switch of a second bridge arm to be on simultaneously or driving a lower power semiconductor switch of the first bridge arm and a lower power semiconductor switch of the second bridge arm to be on simultaneously in the zero level section.

11 Claims, 5 Drawing Sheets

DRIVING METHOD FOR POWER
SEMICONDUCTOR SWITCHES IN
H-BRIDGE CIRCUIT

CROSS-REFERENCE TO RELATED
APPLICATIONS

This application claims the priority of Chinese Patent Application No. 201710106945.5, filed on Feb. 27, 2017, entitled "DRIVING METHOD FOR POWER SEMICONDUCTOR SWITCHES IN H-BRIDGE CIRCUIT", as well as the priority of Chinese Patent Application No. 201711224401.5, filed on Nov. 29, 2017, entitled "DRIVING METHOD FOR POWER SEMICONDUCTOR SWITCHES IN H-BRIDGE CIRCUIT", both of which are hereby incorporated by reference in their entireties.

FIELD OF THE TECHNOLOGY

The present application relates to power supply technologies and, more particularly to a driving method for power semiconductor switches in an H-bridge circuit.

BACKGROUND

A multi-level converter can achieve high output voltage and large power output by improving its topological structure, and usually it includes at least one H-bridge circuit that consists of four power semiconductor switches. At present, the multi-level converter usually uses one of the following modulation modes to adjust its output voltage: sinusoidal pulse width modulation (SPWM), space vector pulse width modulation (SVPWM), selective harmonic elimination pulse width modulation (SHEPWM), staircase/square wave modulation, etc.

In the prior art, when the multi-level converter uses a modulation mode of SHEPWM or staircase/square wave modulation, driving two upper power semiconductor switches of the H-bridge circuit to be on-state simultaneously or driving two lower power semiconductor switches of the H-bridge circuit to be on-state simultaneously can enable the H bridge circuit to output a zero level, and thus enables the multi-level converter to output a zero level. When the multi-level converter uses a modulation mode of SHEPWM or staircase/square wave modulation, the switching frequency of the power semiconductor switches in each H-bridge circuit is relatively lower and a time span of outputting the zero level in the H-bridge circuit is longer. Therefore, during a period of the zero level outputted by the H-bridge circuit, if the power semiconductor switches in the H-bridge circuit cannot be reasonably driven to be on, the losses of the power semiconductor switches in the H-bridge circuit will be seriously uneven, which reduces the useful lifetime of the H-bridge circuit.

Therefore, it is an urgent problem to be solved how to reasonably drive the power semiconductor switches in the H-bridge circuit to be on during zero levels outputted by the H-bridge circuit in the multi-level converter.

SUMMARY

The present application provides a driving method for power semiconductor switches in an H-bridge circuit for solving the technical problem existing in the prior art how to reasonably drive the power semiconductor switches in the H-bridge circuit to be on during zero levels outputted by the H-bridge circuit in a multi-level converter.

A first aspect of the present application provides a driving method for power semiconductor switches in an H-bridge circuit, the H bridge circuit includes a first bridge arm, a second bridge arm and a bus capacitor, the first bridge arm and the second bridge arm are connected to two ends of the bus capacitor in parallel, where each of the first bridge arm and the second bridge arm includes an upper power semiconductor switch and a lower power semiconductor switch, an output voltage is generated between a connection point connecting the upper power semiconductor switch with the lower power semiconductor switch in the first bridge arm and a connection point connecting the upper power semiconductor switch with the lower power semiconductor switch in the second bridge arm; the driving method includes:

calculating a start time and an end time of a zero level of the output voltage and determining a zero level section based on the start time and the end time of the zero level;

driving the upper power semiconductor switch of the first bridge arm and the upper power semiconductor switch of the second bridge arm to be on simultaneously or driving the lower power semiconductor switch of the first bridge arm and the lower power semiconductor switch of the second bridge arm to be on simultaneously in the zero level section;

where each of a first preset duration and a second preset duration includes at least one zero level section; the upper power semiconductor switch of the first bridge arm and the upper power semiconductor switch of the second bridge arm and the lower power semiconductor switch of the first bridge arm and the lower power semiconductor switch of the second bridge arm are turned on with a first turning-on logic sequence in the zero level section within the first preset duration; and the upper power semiconductor switch of the first bridge arm and the upper power semiconductor switch of the second bridge arm and the lower power semiconductor switch of the first bridge arm and the lower power semiconductor switch of the second bridge arm are turned on with a second turning-on logic sequence in the zero level section within the second preset duration.

The driving method for the power semiconductor switches in the H-bridge circuit provided by the present application, driving the lower power semiconductor switch of the first bridge arm and the lower power semiconductor switch of the second bridge arm and the upper power semiconductor switch of the first bridge arm and the upper power semiconductor switch of the second bridge arm to be on using different turning-on logic sequences in the zero level section within different durations can shorten the difference between the working duration of the lower power semiconductor switch of the first bridge arm and the working duration of the upper power semiconductor switch of the first bridge arm in the zero level section and shorten the difference between the working duration of the lower power semiconductor switch of the second bridge arm and the working duration of the upper power semiconductor switch of the second bridge arm in the zero level section. That is, the difference between the working duration of the upper power semiconductor switch and the working duration of the lower power semiconductor switch in the H-bridge circuit in the zero level section is shortened, and thus the losses of the upper power semiconductor switch and the lower power semiconductor switch in the H-bridge circuit are approximate, thus the useful lifetime of the H-bridge circuit is increased. At the same time, because the losses of the upper power semiconductor switch and the lower power semiconductor switch in the same bridge arm are approximate, the exothermic durations of the upper and lower power semiconductor switches are more balanced, which enables the upper and lower power semiconductor switches in the H-bridge circuits of the multilevel converter to use the same thermal design and reduces the cost and volume of the multi-level converter.

BRIEF DESCRIPTION OF THE DRAWINGS

In order to more clearly describe the technical solutions in embodiments of the present application or the prior art, the accompanying drawings, which are required when describing the embodiments or the prior art, will now be briefly described. It will be apparent that the accompanying drawings in the following descriptions are merely some embodiments of the present application, and other drawings can be obtained based on these accompanying drawings by those ordinary skilled in the art without making creative effort.

DETAILED DESCRIPTION

The technical solutions in embodiments of the present application will now be clearly and comprehensively described in conjunction with the accompanying drawings in the embodiments of the present application. It will be apparent that the described embodiments are merely part of the embodiments of the application and are not intended to be exhaustive. All the other embodiments obtained by those ordinary skilled in the art based on the embodiments in the present application without making creative effort shall fall into the scope of the present application.

Figure 1:
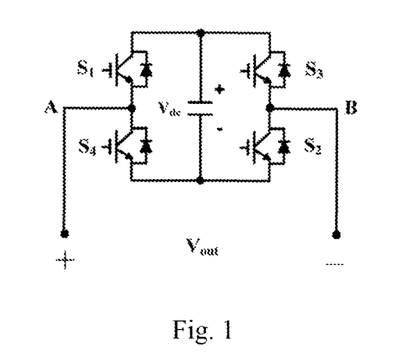
FIG. 1 is a first schematic diagram of an H-bridge circuit in a multi-level converter.
Figure 2A:
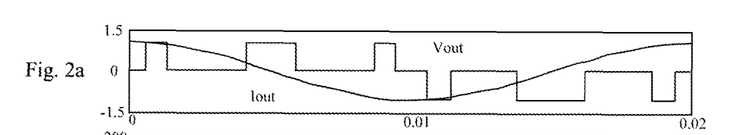
FIGS. 2a-2e are first schematic diagrams of current distribution of power semiconductor switches in an H-bridge circuit.
Figure 2B:
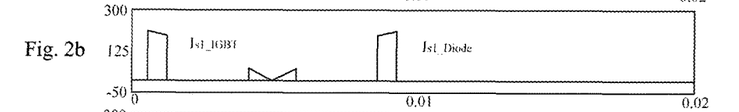
Figure 2C:
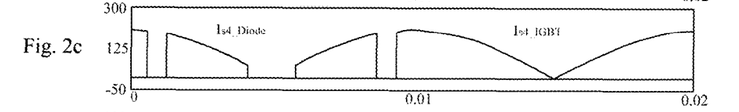
Figure 2D:
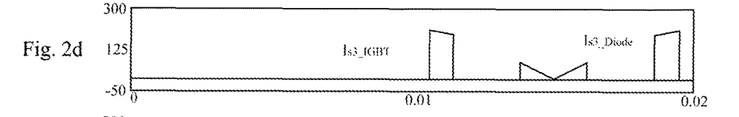
Figure 2E:
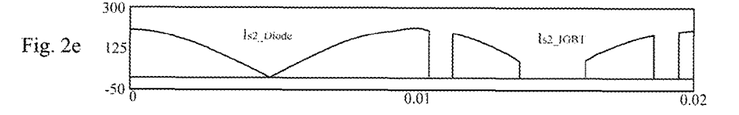

FIG. 1 is a first schematic diagram of an H-bridge circuit in a multi-level converter. As shown in FIG. 1, the H-bridge circuit includes a first bridge arm, a second bridge arm and a bus capacitor, and the direct current (DC) bus voltage between two ends of the bus capacitor is Vdc. The first bridge arm includes an upper power semiconductor switch S1 and a lower power semiconductor switch S4, and the second bridge arm includes an upper power semiconductor switch S3 and a lower power semiconductor switch S2. In other embodiment, the first bridge arm includes the upper power semiconductor switch S3 and the lower power semiconductor switch S2, and the second bridge arm includes the upper power semiconductor switch S1 and the lower power semiconductor switch S4. Each power semiconductor switch may include an insulated gate bipolar transistor (IGBT) and a diode, where the diode is connected in anti-parallel between two ends of the insulated gate bipolar transistor. In other embodiments, each power semiconductor switch may further include an integrated gate commutated thyristors (IGCT), or an injection enhancement gate transistor (IEGT), or a metal-oxide-semiconductor field-effect transistor (MOSFET). In the present embodiment, the multi-level converter includes cascaded H-bridge circuits.

The following descriptions are given by taking the case that the first bridge arm of the H-bridge circuit includes the upper power semiconductor switch S1 and the lower power semiconductor switch S4, and the second bridge arm includes the upper power semiconductor switch S3 and the lower power semiconductor switch S2 as an example. The upper power semiconductor switch S1 and the lower power semiconductor switch S4 of the first bridge arm are connected in series and then connected with the bus capacitor in parallel, and the upper power semiconductor switch S3 and the lower power semiconductor switch S2 of the second bridge arm are connected in series and then connected in parallel with the bus capacitor. An output voltage Vout is generated between a connection point A connecting the upper power semiconductor switch S1 with the lower power semiconductor switch S4 in the first bridge arm and a connection point B connecting the upper power semiconductor switch S3 with the lower power semiconductor switch S2 in the second bridge arm.

In the prior art, when the multi-level converter uses SHEPWM or staircase/square wave modulation, there are some durations in which the output voltage Vout is a zero level, namely multiple zero level sections. In each zero level section, driving the upper power semiconductor switch S1 of the first bridge arm and the upper power semiconductor switch S3 of the second bridge arm to be on simultaneously or driving the lower power semiconductor switch S4 of the first bridge arm and the lower power semiconductor switch S2 of the second bridge arm to be on simultaneously can enable the output voltage Vout of the H bridge circuit to be the zero level, and thus enable the multi-level converter to output a zero level. However, when the multi-level converter uses SHEPWM or staircase/square wave modulation, the switching frequency of each power semiconductor switch in the H-bridge circuit is relatively lower and the duration of each zero level section of the H-bridge circuit is relatively longer. Therefore, when the H-bridge circuit outputs a zero level, if the power semiconductor switches in the H-bridge circuit cannot be reasonably driven, the losses of the upper power semiconductor switches and the lower semiconductor switches of the first bridge arm and the second bridge arm in the H-bridge circuit will be uneven, which reduces the useful lifetime of the H-bridge circuit.

FIGS. 2a-2e are schematic diagrams of current distribution of power semiconductor switches in an H-bridge circuit. As shown in FIGS. 2a-2e, it is assumed that in each zero level section outputted by the H-bridge circuit corresponding to FIG. 2a, the zero level is outputted by driving the lower power semiconductor switch S4 of the first bridge arm and the lower power semiconductor switch S2 of the second bridge arm to be on, so that in these zero level sections, the current only flows through the lower power semiconductor switch S4 of the first bridge arm of the H-bridge circuit and the lower power semiconductor switch S2 of the second bridge arm of the H-bridge circuit, and there is no current that flows through the upper power semiconductor switch S1 of the first bridge arm and the upper power semiconductor switch S3 of the second bridge arm, which causes the difference between the current waveforms of the upper power semiconductor switch and the lower power semiconductor switch of the same bridge arm of the H-bridge circuit in a specific work cycle to be relatively larger.

FIGS. 2a-2e show schematic diagrams of the current distribution of power semiconductor switches in an H-bridge circuit. As shown in FIGS. 2a-2e, taking the case that the work cycle of the H-bridge circuit is 0.02 seconds as an example, when driving the lower power semiconductor switch S4 of the first bridge arm and the lower power semiconductor switch S2 of the second bridge arm to be on in each zero level section, the difference between the current waveform of the upper power semiconductor switch S1 of the first bridge arm (shown in FIG. 2b) and the current waveform of the lower power semiconductor switch S4 of the first bridge arm (shown in FIG. 2c) is relatively larger, and the difference between the current waveform of the lower power semiconductor switch S2 of the second bridge arm (shown in FIG. 2e) and the current waveform of the upper power semiconductor switch S3 of the second bridge arm (shown in FIG. 2d) is relatively larger. That is, the working time of the lower power semiconductor switch S4 of the first bridge arm is longer than the working time of the upper power semiconductor switch S1 of the first bridge arm, and the working time of the lower power semiconductor switch S2 of the second bridge arm is longer than the working time of the upper power semiconductor switch S3 of the second bridge. The loss of the lower power semiconductor switch S4 of the first bridge arm is greater than the loss of the upper power semiconductor switch S1 of the first bridge arm, and the loss of the lower power semiconductor switch S2 of the second bridge arm is greater than the loss of the upper power semiconductor switch S3 of the second bridge arm. In other words, the loss of the lower power semiconductor switch of each bridge arm of the H-bridge circuit is larger than the loss of the upper power semiconductor switch thereof, which reduces the useful lifetime of the lower power semiconductor switches of the H-bridge circuit, and thus reduces the useful lifetime of the H-bridge circuit. At the same time, because the working duration of the lower power semiconductor switch of each bridge arm of the H-bridge circuit is longer than the working duration of the upper power semiconductor switch thereof, the exothermic durations of the lower power semiconductor switches of the H-bridge circuit are longer, which causes the thermal design of the multi-level converter to be inconformity, and thus increases the cost and volume of the multi-level converter.

Therefore, it is an urgent problem to be solved how to reasonably drive the power semiconductor switches in the H-bridge circuit to be on when the H-bridge circuit in the multi-level converter outputs the zero level.

The technical solutions of the present application will be described in detail with reference to specific embodiments. The following specific embodiments may be combined with each other, and the same or similar concepts or processes may not be repeated in some embodiments.

Figure 3:
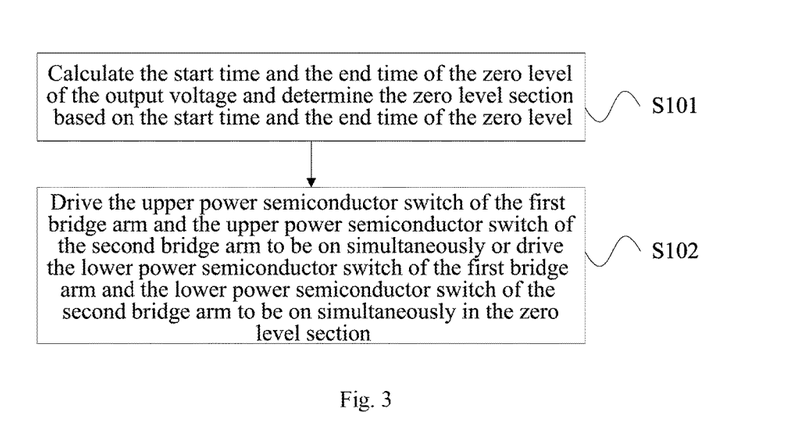
FIG. 3 is a flowchart of a driving method for power semiconductor switches provided by an embodiment of the present application.

FIG. 3 is a flowchart of a driving method for power semiconductor switches in an H-bridge circuit provided by an embodiment of the present application. The executive entity of the present embodiment can be a driving device which may include a control circuit for calculating a start time and an end time of a zero level of a output voltage, determining a zero level section based on the start time and the end time and meanwhile outputting a corresponding control signal in the zero level section, and a drive circuit for receiving the control signal and generating a driving signal based on the control signal to drive the corresponding power semiconductor switch to be on or off. As shown in FIG. 1, the present embodiment relates to a specific process how the driving device drives the upper power semiconductor switch S1 of the first bridge arm and the upper power semiconductor switch S3 of the second bridge arm as well as the lower power semiconductor switch S4 of the first bridge arm and the lower power semiconductor switch S2 of the second bridge arm to be on in the first preset duration and the second duration to output the zero level. As shown in FIG. 3, the method can include:

S101, calculate the start time and the end time of the zero level of the output voltage and determine the zero level section based on the start time and the end time of the zero level.

Specifically, in the present embodiment, the duration of the output voltage Vout of the H-bridge circuit can include a plurality of first preset durations and a plurality of second preset durations, where the first preset duration and the second preset duration may be two durations adjacent in time, and the first preset duration and the second preset duration may be alternated with each other. The time span of the first preset duration and the time span of the second preset duration may be the same or different. In the present embodiment, each of the first preset duration and the second preset duration can include at least one zero level section. Therefore, the control circuit can first calculate the start time and the end time of the zero level of the output voltage within the first preset duration and the second preset duration, and then determine a zero level section within the first preset duration and a zero level section within the second preset duration based on the start time and the end time. Here, the zero level section may be a time period in which a zero level is continuously outputted.

It should be noted that the specific implementation for the control circuit to calculate the start time and the end time of the zero level of the output voltage in the first preset duration and the second preset duration and determine the zero level sections based on the start time and the end time can be found in the prior art, and will not be repeated here.

S102, drive the upper power semiconductor switch of the first bridge arm and the upper power semiconductor switch of the second bridge arm to be on simultaneously or drive the lower power semiconductor switch of the first bridge arm and the lower power semiconductor switch of the second bridge arm to be on simultaneously in the zero level section.

Specifically, after determining the zero level section within the first preset duration and the zero level section within the second preset duration via the control circuit, the drive circuit can drive the upper power semiconductor switch S1 of the first bridge arm and the upper power semiconductor switch S3 of the second bridge arm and the lower power semiconductor switch S4 of the first bridge arm and the lower power semiconductor switch S2 of the second bridge arm to be on with a first turning-on logic sequence in the zero level section within the first preset duration, and drive the upper power semiconductor switch S1 of the first bridge arm and the upper power semiconductor switch S3 of the second bridge arm and the lower power semiconductor switch S4 of the first bridge arm and the lower power semiconductor switch S2 of the second bridge arm to be on with a second turning-on logic sequence in the zero level section within the second preset duration.

The first turning-on logic sequence and the second turning-on logic sequence are different logic sequences and the first preset duration and the second preset duration are two durations adjacent in time. Taking the case that the first turning-on logic sequence and the second turning-on logic sequence are different logic sequences as an example, the first turning-on logic sequence and the second turning-on logic sequence may include the following cases:

The first case: when both the first preset duration and the second preset duration include one zero level section, the first turning-on logic sequence is that the upper power semiconductor switch S1 of the first bridge arm and the upper power semiconductor switch S3 of the second bridge arm are turned on simultaneously in the zero level section within the first preset duration, and the second turning-on logic sequence is that the lower power semiconductor switch S4 of the first bridge arm and the lower power semiconductor switch S2 of the second bridge arm are turned on simultaneously in the zero level section within the second preset duration. Or, the first turning-on logic sequence is that the lower power semiconductor switch S4 of the first bridge arm and the lower power semiconductor switch S2 of the second bridge arm are turned on simultaneously in the zero level section within the first preset duration, and the second turning-on logic sequence is that the upper power semiconductor switch S1 of the first bridge arm and the upper power semiconductor switch S3 of the second bridge arm are turned on simultaneously in the zero level section within the second preset duration.

The second case: when both the first preset duration and the second preset duration include at least two zero level sections (i.e., two or more zero level sections), the first turning-on logic sequence may be that the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm are performed alternately in the two or more zero level sections within the first preset duration. That is, the upper power semiconductor switch S1 of the first bridge arm and the upper power semiconductor switch S3 of the second bridge arm are driven to be on simultaneously in the first zero level section within the first preset duration. The lower power semiconductor switch S4 of the first bridge arm and the lower power semiconductor switch S2 of the second bridge arm are driven to be on simultaneously in the second zero level section within the first preset duration. The upper power semiconductor switch S1 of the first bridge arm and the upper power semiconductor switch S3 of the second bridge arm are driven to be on simultaneously in the third zero level section within the first preset duration. Use this analogy until the last zero level section within the first preset duration. That is, the initial turning-on logic of the first turning-on logic sequence is that the upper power semiconductor switch S1 of the first bridge arm and the upper power semiconductor switch S3 of the second bridge arm are turned on simultaneously.

Then, in this implementation, the second turning-on logic sequence may be that the simultaneous turning-on of the lower power semiconductor switch S4 of the first bridge arm and the lower power semiconductor switch S2 of the second bridge arm and the simultaneous turning-on of the upper power semiconductor switch S1 of the first bridge arm and the upper power semiconductor switch S3 of the second bridge arm are performed alternately in the two or more zero level sections within the second preset duration. That is, the lower power semiconductor switch S4 of the first bridge arm and the lower power semiconductor switch S2 of the second bridge arm are driven to be on simultaneously in the first zero level section within the second preset duration. The upper power semiconductor switch S1 of the first bridge arm and the upper power semiconductor switch S3 of the second bridge arm are driven to be on simultaneously in the second zero level section within the second preset duration. The lower power semiconductor switch S4 of the first bridge arm and the lower power semiconductor switch S2 of the second bridge arm are driven to be on simultaneously in the third zero level section within the second preset duration. Use this analogy until the last zero level section in the second preset duration. That is, the initial turning-on logic of the second turning-on logic sequence is that the lower power semiconductor switch S4 of the first bridge arm and the lower power semiconductor switch S2 of the second bridge arm are turned on simultaneously.

Or, the first turning-on logic sequence may be that the simultaneous turning-on of the lower power semiconductor switch S4 of the first bridge arm and the lower power semiconductor switch S2 of the second bridge arm and the simultaneous turning-on of the upper power semiconductor switch S1 of the first bridge arm and the upper power semiconductor switch S3 of the second bridge arm are performed alternately in the two or more zero level sections within the first preset duration. Then, in this implementation, the second turning-on logic sequence may be that the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm are performed alternately in the two or more zero level sections within the second preset duration. That is, the initial turning-on logic of the first turning-on logic sequence is that the lower power semiconductor switch S4 of the first bridge arm and the lower power semiconductor switch S2 of the second bridge arm are turned on simultaneously. The initial turning-on logic of the second turning-on logic sequence is that the upper power semiconductor switch S1 of the first bridge arm and the upper power semiconductor switch S3 of the second bridge arm are turned on simultaneously.

The third case: when both the first preset duration and the second preset duration comprise at least two zero level sections (i.e., two or more zero level sections), the first turning-on logic sequence is that the upper power semiconductor switch S1 of the first bridge arm and the upper power semiconductor switch S3 of the second bridge arm are turned on simultaneously in each zero level section within the first preset duration; and the second turning-on logic sequence is that the lower power semiconductor switch S4 of the first bridge arm and the lower power semiconductor switch S2 of the second bridge arm are turned on simultaneously in each zero level section within the second preset duration.

Or, the first turning-on logic sequence is that the lower power semiconductor switch S4 of the first bridge arm and the lower power semiconductor switch S2 of the second bridge arm are turned on simultaneously in each zero level section within the first preset duration; and the second turning-on logic sequence is that the upper power semiconductor switch S1 of the first bridge arm and the upper power semiconductor switch S3 of the second bridge arm are turned on simultaneously in each zero level section within the second preset duration.

In the present embodiment, driving the lower power semiconductor switch of the first bridge arm and the lower power semiconductor switch of the second bridge arm and the upper power semiconductor switch of the first bridge arm and the upper power semiconductor switch of the second bridge arm to be on using different turning-on logic sequences in the zero level sections within different durations, can shorten the difference between the working durations of the lower power semiconductor switch of the first bridge arm and the upper power semiconductor switch of the first bridge arm when the output voltage is zero level and the difference between the working durations of the lower power semiconductor switch of the second bridge arm and the upper power semiconductor switch of the second bridge arm when the output voltage is zero level. That is, the difference between the working durations of the upper power semiconductor switch and the lower power semiconductor switch in the same bridge arm of the H-bridge circuit when the output voltage is zero level is shortened, and thus the losses of the upper power semiconductor switch and the lower power semiconductor switch in the same bridge arm are approximate, thereby increasing the useful lifetime of the H-bridge circuit. At the same time, because the losses of the upper power semiconductor switch and the lower power semiconductor switch in the same bridge arm are approximate, the exothermic durations of the upper and lower power semiconductor switches are more balanced, which allows the multi-level converter to use the same thermal design for the upper and lower power semiconductor switches, and thus reduces the cost and volume of the multi-level converter.

Further, on the basis of the above-described embodiment, when both the first preset duration and the second preset duration include at least two zero level sections, the time span of the second preset duration may be the same as the time span of the first preset duration, and the second preset duration and the first preset duration are two durations adjacent in time. Where the first turning-on logic sequence is different from the second turning-on logic sequence. For example, the first turning-on logic sequence and the second turning-on logic sequence may be any combination listed in the second case.

In this way, when the driving device drives the power semiconductor switches in the H-bridge circuit to be on with the first turning-on logic sequence and the second turning-on logic sequence, not only the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm to be performed alternately in the zero level sections within the first preset duration or in the zero level sections within the second preset duration, but also the alternation sequence of "the upper power semiconductor switch S1 of the first bridge arm and the upper power semiconductor switch S3 of the second bridge arm" and "the lower power semiconductor switch S4 of the first bridge arm and the lower power semiconductor switch S2 of the second bridge arm" to be alternately changed between two adjacent preset durations.

In this way, the difference between the working durations of the lower power semiconductor switch S4 of the first bridge arm and the upper power semiconductor switch S1 of the first bridge arm when output voltage is zero level and the difference between the working durations of the lower power semiconductor switch S2 of the second bridge arm and the upper power semiconductor switch S3 of the second bridge arm when the output voltage is zero level are further shortened. That is, the difference between the working durations of the upper power semiconductor switch and the lower power semiconductor switch in the same bridge arm of the H-bridge circuit when the output voltage is zero level is further shortened, and thus the losses of the upper power semiconductor switch and the lower power semiconductor switch in the same bridge arm are approximate, which increases the useful lifetime of the H-bridge circuit. At the same time, because the losses of the upper power semiconductor switch and the lower power semiconductor switch in the same bridge arm are approximate, the exothermic durations of the upper and lower power semiconductor switches are more balanced, which allows the multi-level converter to use the same thermal design for the upper and lower power semiconductor switches, and thus reduces the cost and volume of the multi-level converter.

The output waveforms of the H-bridge circuit in any two half work cycles in its work cycles are approximately the same. When the first preset duration and the second preset duration are N times one-half work cycle of the H-bridge circuit, the difference between the working durations of the lower power semiconductor switch S4 of the first bridge arm and the upper power semiconductor switch S1 of the first bridge arm when the output voltage is zero level and the difference between the working durations of the lower power semiconductor switch S2 of the second bridge arm and the upper power semiconductor switch S3 of the second bridge arm when the output voltage is zero level are further shortened using the above-described method. Where N≥1 and N is a natural number.

Figure 4:
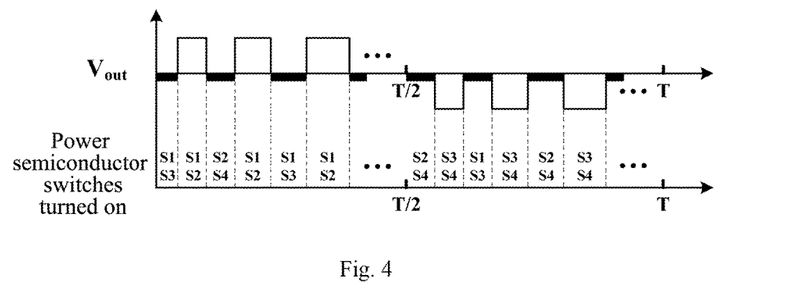
FIG. 4 is a first logic diagram for driving power semiconductor switches provided by the present application.

One work cycle of the H-bridge circuit is taken as an example, where the first preset duration is the first half work cycle thereof (i.e., the previous T/2 work cycle) and the second preset duration is the second half work cycle thereof (i.e., the posterior T/2 work cycle). In this implementation, taking the case that the first turning-on logic sequence is that the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm are performed alternately in the zero level sections within the first preset duration, and the second turning-on logic sequence is that the simultaneous turning-on of the lower power semiconductor switch S4 of the first bridge arm and the lower power semiconductor switch S2 of the second bridge arm and the simultaneous turning-on of the upper power semiconductor switch S1 of the first bridge arm and the upper power semiconductor switch S3 of the second bridge arm are performed alternately in the zero level sections within the second preset duration as an example, FIG. 4 is a first logic diagram for driving power semiconductor switches provided by the present application. As shown in FIG. 4, the driving device uses the first turning-on logic sequence in the first preset duration (i.e., the previous T/2 work cycle); the upper power semiconductor switch S1 of the first bridge arm and the upper power semiconductor switch S3 of the second bridge arm are driven to be on during the first zero level section of the output voltage Vout, and the lower power semiconductor switch S4 of the first bridge arm and the lower power semiconductor switch S2 of the second bridge arm are driven to be on during the second zero level section of the output voltage Vout. Use this analogy until the end of the first preset duration (i.e., the end of the previous T/2 work cycle). The driving device uses the second turning-on logic sequence in the second preset duration (i.e., the posterior T/2 work cycle); the lower power semiconductor switch S4 of the first bridge arm and the lower power semiconductor switch S2 of the second bridge arm are driven to be on during the first zero level section of the output voltage Vout, and the upper power semiconductor switch S1 of the first bridge arm and the upper power semiconductor switch S3 of the second bridge arm are driven to be on during the second zero level section of the output voltage Vout. Use this analogy until the end of the second preset duration (i.e., the end of the posterior T/2 work cycle).

Figure 5:
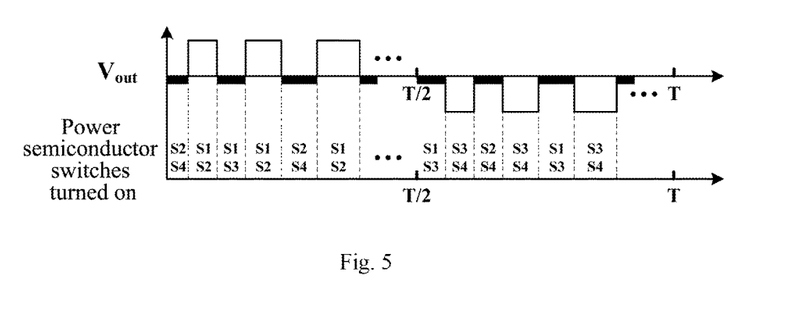
FIG. 5 is a second logic diagram for driving power semiconductor switches provided by the present application.

In this implementation, taking the case that the first turning-on logic sequence is that the simultaneous turning-on of the lower power semiconductor switch S4 of the first bridge arm and the lower power semiconductor switch S2 of the second bridge arm and the simultaneous turning-on of the upper power semiconductor switch S1 of the first bridge arm and the upper power semiconductor switch S3 of the second bridge arm are performed alternately in the zero level sections within the first preset duration, and the second turning-on logic sequence is that the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm are performed alternately in the zero level sections within the second preset duration as an example, FIG. 5 is a second logic diagram for driving power semiconductor switches provided by the present application. As shown in FIG. 5, the driving device uses the first turning-on logic sequence in the first preset duration (i.e., the previous T/2 work cycle); the lower power semiconductor switch S4 of the first bridge arm and the lower power semiconductor switch S2 of the second bridge arm are driven to be on during the first zero level section of the output voltage Vout, and the upper power semiconductor switch S1 of the first bridge arm and the upper power semiconductor switch S3 of the second bridge arm are driven to be on during the second zero level section of the output voltage Vout. Use this analogy until the end of the first preset duration (i.e., the end of the previous T/2 work cycle). The driving device uses the second turning-on logic sequence in the second preset duration (i.e., the posterior T/2 work cycle); the upper power semiconductor switch S1 of the first bridge arm and the upper power semiconductor switch S3 of the second bridge arm are driven to be on during the first zero level section of the output voltage Vout, and the lower power semiconductor switch S4 of the first bridge arm and the lower power semiconductor switch S2 of the second bridge arm are driven to be on during the second zero level section of the output voltage Vout. Use this analogy until the end of the second preset duration (i.e., the end of the posterior T/2 work cycle).

The voltage waveform outputted by the H-bridge circuit is not a fixed pulse voltage or is a fixed pulse voltage. The duration corresponding to respective zero level section may be different from each other within one-half work cycle, so that the total duration in which the lower power semiconductor switch S4 of the first bridge arm and the lower power semiconductor switch S2 of the second bridge arm are turned on may be different from the total duration in which the upper power semiconductor switch S1 of the first bridge arm and the upper power semiconductor switch S3 of the second bridge arm are turned on in one-half work cycle. Therefore, the turning-on logic sequences of "the lower power semiconductor switch S4 of the first bridge arm and the lower power semiconductor switch S2 of the second bridge arm" and "the upper power semiconductor switch S1 of the first bridge arm and the upper power semiconductor switch S3 of the second bridge arm" can be exchanged in any two adjacent half work cycles. In other words, the upper power semiconductor switch S1 of the first bridge arm and the upper power semiconductor switch S3 of the second bridge arm are turned on in the first zero level section within the first half work cycle and the lower power semiconductor switch S4 of the first bridge arm and the lower power semiconductor switch S2 of the second bridge arm are turned on in the first zero level section within the second half work cycle; or the lower power semiconductor switch S4 of the first bridge arm and the lower power semiconductor switch S2 of the second bridge arm are turned on in the first zero level section within the first half work cycle and the upper power semiconductor switch S1 of the first bridge arm and the upper power semiconductor switch S3 of the second bridge arm are turned on in the first zero level section within the second half work cycle. In this way, even if the total duration in which the lower power semiconductor switch S4 of the first bridge arm and the lower power semiconductor switch S2 of the second bridge arm are turned on in the first half work cycle may be different from the total duration in which the upper power semiconductor switch S1 of the first bridge arm and the upper power semiconductor switch S3 of the second bridge arm are turned on in the second half work cycle, by means of the manner of exchanging the turning-on logic sequences of "the upper power semiconductor switch S1 of the first bridge arm and the upper power semiconductor switch S3 of the second bridge arm" and "the lower power semiconductor switch S4 of the first bridge arm and the lower power semiconductor switch S2 of the second bridge arm" in adjacent half work cycles, the total duration in which the upper power semiconductor switch S1 of the first bridge arm and the upper power semiconductor switch S3 of the second bridge arm are turned on is consistent with the total duration in which the lower power semiconductor switch S4 of the first bridge arm and the lower power semiconductor switch S2 of the second bridge arm are turned on in two adjacent half work cycles, so that the losses of the upper power semiconductor switches and the lower power semiconductor switches of the H-bridge circuit are the same or approximately the same, and thus the useful lifetime of the H-bridge circuit is increased.

For another example, the first turning-on logic sequence and the second turning-on logic sequence may be any combination listed in the third case.

In this way, the driving device drives the power semiconductor switches in the H-bridge circuit to be on with the first turning-on logic sequence and the second turning-on logic sequence. The upper power semiconductor switch S1 of the first bridge arm and the upper power semiconductor switch S3 of the second bridge arm being turned on simultaneously in each zero level section within the first preset duration, and the lower power semiconductor switch S4 of the first bridge arm and the lower power semiconductor switch S2 of the second bridge arm being turned on simultaneously in each zero level section within the second preset duration; or the lower power semiconductor switch S4 of the first bridge arm and the lower power semiconductor switch S2 of the second bridge arm being turned on simultaneously in each zero level section within the first preset duration, and the upper power semiconductor switch S1 of the first bridge arm and the upper power semiconductor switch S3 of the second bridge arm being turned on simultaneously in each zero level section within the second preset duration, not only the lower power semiconductor switch of the first bridge arm and the lower power semiconductor switch of the second bridge arm are turned on simultaneously and the upper power semiconductor switch of the first bridge arm and the upper power semiconductor switch of the second bridge arm are turned on simultaneously using different turning-on logic sequences in the zero level sections within different preset durations, but also the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm can be alternately changed between two adjacent preset durations.

Figure 10:
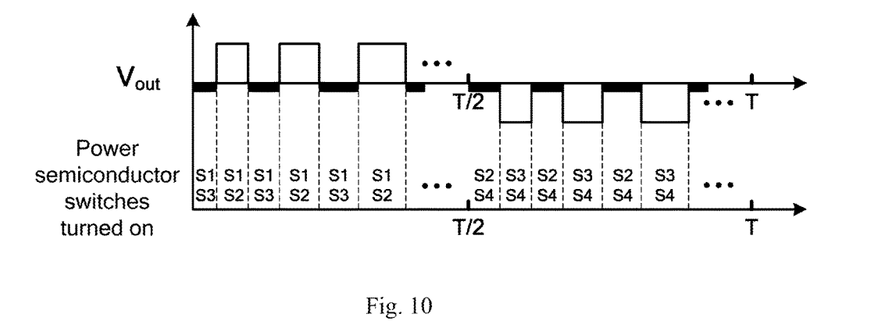
FIG. 10 is a third logic diagram for driving power semiconductor switches provided by the present application.

One work cycle of the H-bridge circuit is taken as an example, where the first preset duration is the first half work cycle thereof (i.e., the previous T/2 work cycle) and the second preset duration is the second half work cycle thereof (i.e., the posterior T/2 work cycle). In this implementation, taking the case that the first turning-on logic sequence is that the upper power semiconductor switch S1 of the first bridge arm and the upper power semiconductor switch S3 of the second bridge arm are turned on simultaneously in each zero level section within the first preset duration, and the second turning-on logic sequence is that the lower power semiconductor switch S4 of the first bridge arm and the lower power semiconductor switch S2 of the second bridge arm are turned on simultaneously in each zero level section within the second preset duration as an example, FIG. 10 is a third logic diagram for driving power semiconductor switches provided by the present application. As shown in FIG. 10, the driving device uses the first turning-on logic sequence in the first preset duration (i.e., the previous T/2 work cycle); the upper power semiconductor switch S1 of the first bridge arm and the upper power semiconductor switch S3 of the second bridge arm are driven to be on during all the zero level sections of the output voltage Vout. That is, the upper power semiconductor switch S1 of the first bridge arm and the upper power semiconductor switch S3 of the second bridge arm are driven to be on during the first zero level section of the output voltage Vout. The upper power semiconductor switch S1 of the first bridge arm and the upper power semiconductor switch S3 of the second bridge arm are still driven to be on during the second zero level section of the output voltage Vout. Use this analogy until the end of the first preset duration (i.e., the end of the previous T/2 work cycle). The driving device uses the second turning-on logic sequence in the second preset duration (i.e., the posterior T/2 work cycle); the lower power semiconductor switch S4 of the first bridge arm and the lower power semiconductor switch S2 of the second bridge arm are driven to be on during all the zero level sections of the output voltage Vout. That is, the lower power semiconductor switch S4 of the first bridge arm and the lower power semiconductor switch S2 of the second bridge arm are driven to be on during the first zero level section of the output voltage Vout. The lower power semiconductor switch S4 of the first bridge arm and the lower power semiconductor switch S2 of the second bridge arm are still driven to be on during the second zero level section of the output voltage Vout. Use this analogy until the end of the second preset duration (i.e., the end of the posterior T/2 work cycle).

Figure 11:
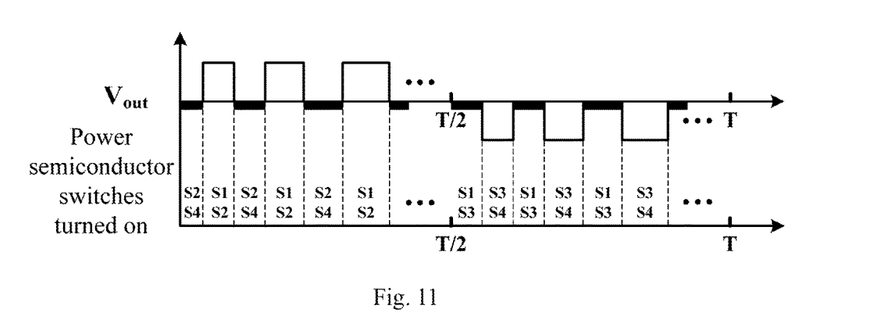
FIG. 11 is a fourth logic diagram for driving power semiconductor switches provided by the present application.

In this implementation, taking the case that the first turning-on logic sequence is that the lower power semiconductor switch S4 of the first bridge arm and the lower power semiconductor switch S2 of the second bridge arm are turned on simultaneously in each zero level section within the first preset duration; and the second turning-on logic sequence is that the upper power semiconductor switch S1 of the first bridge arm and the upper power semiconductor switch S3 of the second bridge arm are turned on simultaneously in each zero level section within the second preset duration as an example, FIG. 11 is a fourth logic diagram for driving power semiconductor switches provided by the present application. As shown in FIG. 11, the driving device uses the first turning-on logic sequence in the first preset duration (i.e., the previous T/2 work cycle); the lower power semiconductor switch S4 of the first bridge arm and the lower power semiconductor switch S2 of the second bridge arm are driven to be on during all the zero level sections of the output voltage Vout. That is, the lower power semiconductor switch S4 of the first bridge arm and the lower power semiconductor switch S2 of the second bridge arm are driven to be on during the first zero level section of the output voltage Vout. The lower power semiconductor switch S4 of the first bridge arm and the lower power semiconductor switch S2 of the second bridge arm are still driven to be on during the second zero level section of the output voltage Vout. Use this analogy until the end of the first preset duration (i.e., the end of the previous T/2 work cycle). The driving device uses the second turning-on logic sequence in the second preset duration (i.e., the posterior T/2 work cycle); the upper power semiconductor switch S1 of the first bridge arm and the upper power semiconductor switch S3 of the second bridge arm are driven to be on during all the zero level sections of the output voltage Vout. That is, the upper power semiconductor switch S1 of the first bridge arm and the upper power semiconductor switch S3 of the second bridge arm are driven to be on during the first zero level section of the output voltage Vout. The upper power semiconductor switch S1 of the first bridge arm and the upper power semiconductor switch S3 of the second bridge arm are still driven to be on during the second zero level section of the output voltage Vout. Use this analogy until the end of the second preset duration (i.e., the end of the posterior T/2 work cycle).

Using the above implementations, driving the lower power semiconductor switch of the first bridge arm and the lower power semiconductor switch of the second bridge arm and the upper power semiconductor switch of the first bridge arm and the upper power semiconductor switch of the second bridge arm to be on using different turning-on logic sequences in the zero level sections within different durations can shorten the difference between the working durations of the lower power semiconductor switch of the first bridge arm and the upper power semiconductor switch of the first bridge arm when the output voltage is zero level and the difference between the working durations of the lower power semiconductor switch of the second bridge arm and the upper power semiconductor switch of the second bridge arm when the output voltage is zero level. That is, the difference between the working durations of the upper power semiconductor switch and the lower power semiconductor switch in the same bridge arm of the H-bridge circuit when the output voltage is zero level is shortened, and thus the losses of the upper power semiconductor switch and the lower power semiconductor switch in the same bridge arm are approximate, thereby increasing the useful lifetime of the H-bridge circuit. At the same time, because the losses of the upper power semiconductor switch and the lower power semiconductor switch in the same bridge arm are approximate, the exothermic durations of the upper and lower power semiconductor switches are more balanced, which allows the multi-level converter to use the same thermal design for the upper and lower power semiconductor switches, and thus reduces the cost and volume of the multi-level converter.

It should be noted that the above-described example describes the driving method provided by the present application by taking the case that both the first preset duration and the second preset duration are one-half work cycle as an example. However, it will be understood by those skilled in the art that when the first preset duration and the second preset duration is greater than one-half work cycle, for example, being one work cycle, two work cycles, etc, the method provided by the present application can also be used to achieve the above technical effects, which will not be repeated here.

Figure 6:
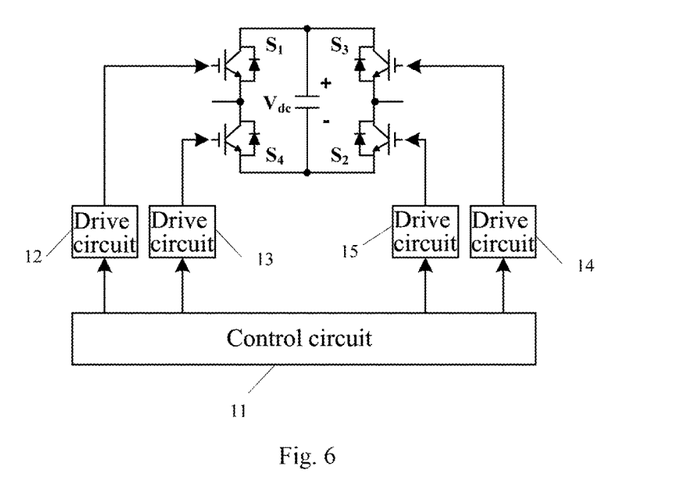
FIG. 6 is a second schematic diagram of an H-bridge circuit in a multi-level converter.

As an implementation, the driving device described in the above-described embodiments may be a separate circuit or may also be integrated in an H-bridge circuit. FIG. 6 is a second schematic diagram of an H-bridge circuit in a multi-level converter. As shown in FIG. 6, when the driving device is integrated in the H-bridge circuit, the H-bridge circuit can further include a control circuit 11 and a plurality of drive circuits. The number of the plurality of drive circuits may be specifically determined based on the number of the power semiconductor switches in the H-bridge circuit. Taking the case that a first bridge arm of the H-bridge circuit includes an upper power semiconductor switch S1 and a lower power semiconductor switch S4, and a second bridge arm includes an upper power semiconductor switch S3 and a lower power semiconductor switch S2 as an example, the H-bridge circuit can include four drive circuits, which are a drive circuit 12, a drive circuit 13, a drive circuit 14, and a drive circuit 15, respectively. Where an output terminal of the control circuit 11 is connected to an input terminal of the drive circuit 12, an input terminal of the drive circuit 13, an input terminal of the drive circuit 14 and an input terminal of the drive circuit 15, respectively. An output terminal of the drive circuit 12 is connected to a control terminal of the upper power semiconductor switch S1 of the first bridge arm in the H-bridge circuit; an output terminal of the drive circuit 13 is connected to a control terminal of the lower power semiconductor switch S4 of the first bridge arm in the H-bridge circuit; an output terminal of the drive circuit 14 is connected to a control terminal of the upper power semiconductor switch S3 of the second bridge arm in the H bridge circuit; and an output terminal of the drive circuit 15 is connected to a control terminal of the lower power semiconductor switch S2 of the second bridge arm in the H bridge circuit. That is, the control circuit 11 and the drive circuit 12 constitute the driving device described in the above-described embodiments.

The control circuit 11 is used to calculate the start time and the end time of the zero level of the output voltage, determine the zero level section based on the start time and the end time and output a first control signal, a second control signal, a third control signal and a fourth control signal to the drive circuit 12, the drive circuit 13, the drive circuit 14 and the drive circuit 15, respectively, in the zero level section. The drive circuit 12 is used to receive the first control signal sent by the control circuit 11 and output a first driving signal to the upper power semiconductor switch S1 of the first bridge arm to drive the upper power semiconductor switch S1 of the first bridge arm to be on or off. The drive circuit 13 is used to receive the second control signal sent by the control circuit 11 and output a second driving signal to the lower power semiconductor switch S4 of the first bridge arm to drive the lower power semiconductor switch S4 of the first bridge arm to be on or off. The drive circuit 14 is used to receive the third control signal sent by the control circuit 11 and output a third driving signal to the upper power semiconductor switch S3 of the second bridge arm to drive the upper power semiconductor switch S3 of the second bridge arm to be on or off. The drive circuit 15 is used to receive the fourth control signal sent by the control circuit 11 and output a fourth driving signal to the lower power semiconductor switch S2 of the second bridge arm to drive the lower power semiconductor switch S2 of the second bridge arm to be on or off. It should be noted that the specific configurations of the control circuit and the drive circuits can be found in the prior art, and will not be repeated here.

The driving method for the power semiconductor switches in the H-bridge circuit provided by the present application will be described in detail in conjunction with two specific examples. In the following examples, the second preset duration and the first preset duration are two durations that have the same time span and are adjacent in time. Where the first preset duration is the previous T/2 work cycle and the second preset duration is the posterior T/2 work cycle. The first turning-on logic sequence is that the simultaneous turning-on of the lower power semiconductor switch S4 of the first bridge arm and the lower power semiconductor switch S2 of the second bridge arm and the simultaneous turning-on of the upper power semiconductor switch S1 of the first bridge arm and the upper power semiconductor switch S3 of the second bridge arm are performed alternately, and the second turning-on logic sequence is that the simultaneous turning-on of the upper power semiconductor switch S1 of the first bridge arm and the upper power semiconductor switch S3 of the second bridge arm and the simultaneous turning-on of the lower power semiconductor switch S4 of the first bridge arm and the lower power semiconductor switch S2 of the second bridge arm are performed alternately.

Example 1

Figure 7:
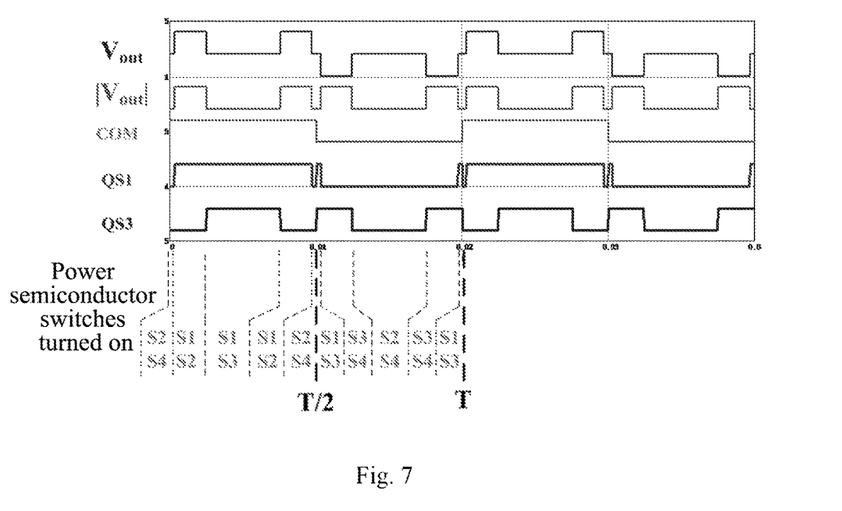
FIG. 7 is a first schematic diagram for turning on power semiconductor switches in an H-bridge circuit provided by the present application.

FIG. 7 is a first schematic diagram for turning on power semiconductor switches in an H-bridge circuit provided by the present application. As shown in FIG. 7, it is assumed that the control circuit 11 calculates the start time and the end time of the zero level of the output voltage Vout of each T/2 work cycle and determines, based on the start time and the end time, that each T/2 work cycle includes three zero level sections, namely an odd number of zero level sections. In the present embodiment, Vout is the output voltage waveform of the H-bridge circuit, and |Vout| is the waveform of the absolute value of the output voltage of the H-bridge circuit. COM is the waveform of the polarity of the output voltage of the H-bridge circuit. When the polarity of the output voltage Vout of the H-bridge is positive (the positive is derived from the modulation wave of the H-bridge circuit in the control circuit, and when the modulation wave is larger than 0, the polarity of the output voltage of the H bridge is positive), COM=1. When the polarity of the output voltage of the H bridge is negative, COM=0. QS1 is a control signal waveform of the upper power semiconductor switch S1 of the first bridge arm, and QS3 is a control signal waveform of the upper power semiconductor switch S3 of the second bridge arm, where a control signal waveform of the lower power semiconductor switch S4 of the first bridge arm is complementary to the control signal waveform of the upper power semiconductor switch S1 of the first bridge arm, and thus is omitted here; a control signal waveform of the lower power semiconductor switch S2 of the second bridge arm is complementary to the control signal waveform of the upper power semiconductor switch S3 of the second bridge arm, and thus is omitted here.

In the previous T/2 work cycle, the control circuit 11 can output the first control signal to the drive circuit 12 in the first zero level section, i.e., in the first zero level section of the output voltage Vout for enabling the drive circuit 12 to output the first driving signal to the upper power semiconductor switch S1 of the first bridge arm to drive the upper power semiconductor switch S1 of the first bridge arm to be off. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be on. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be off. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be on.

The control circuit 11 can output the first control signal to the drive circuit 12 in the second zero level section, i.e., in the second zero level section of the output voltage Vout for enabling the drive circuit 12 to output the first driving signal to the upper power semiconductor switch S1 of the first bridge arm to drive the upper power semiconductor switch S1 of the first bridge arm to be on. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be off. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be on. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be off. Use this analogy until the end of the previous T/2 work cycle.

In the posterior T/2 work cycle, the control circuit can output the first control signal to the drive circuit 12 in the first zero level section, i.e., in the first zero level section of the output voltage Vout for enabling the drive circuit 12 to output the first driving signal to the upper power semiconductor switch S1 of the first bridge arm to drive the upper power semiconductor switch S1 of the first bridge arm to be on. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be off. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be on. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be off.

The control circuit can output the first control signal to the drive circuit 12 in the second zero level section, i.e., in the second zero level section of the output voltage Vout for enabling the drive circuit 12 to output the first driving signal to the upper power semiconductor switch S1 of the first bridge arm to drive the upper power semiconductor switch S1 of the first bridge arm to be off. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be on. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be off. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be on. Use this analogy until the end of the posterior T/2 work cycle.

In the above example, one-half work cycle contains an odd number of zero level sections and the duration of respective zero level section is different from each other, therefore, by means of exchanging the turning-on sequences of "the upper power semiconductor switch S1 of the first bridge arm and the upper power semiconductor switch S3 of the second bridge arm" and "the lower power semiconductor switch S4 of the first bridge arm and the lower power semiconductor switch S2 of the second bridge arm" in the previous T/2 work cycle and the posterior T/2 work cycle, the upper power semiconductor switch S1 of the first bridge arm and the upper power semiconductor switch S3 of the second bridge arm are turned on in the first zero level section within the previous T/2 work cycle and the lower power semiconductor switch S4 of the first bridge arm and the lower power semiconductor switch S2 of the second bridge arm are turned on in the first zero level section within the posterior T/2 work cycle; or the lower power semiconductor switch S4 of the first bridge arm and the lower power semiconductor switch S2 of the second bridge arm are turned on in the first zero level section within the previous T/2 work cycle and the upper power semiconductor switch S1 of the first bridge arm and the upper power semiconductor switch S3 of the second bridge arm are turned on in the first zero level section within the posterior T/2 work cycle. In this way, the total duration in which the power semiconductor switch S1 and the power semiconductor switch S3 are turned on is consistent with the total duration in which the power semiconductor switch S2 and the power semiconductor switch S4 are turned on in the whole work cycle, so that the losses of the upper power semiconductor switch and the lower power semiconductor switch in the same bridge arm are the same or approximately the same, and thus the useful lifetime of the H-bridge circuit is increased.

Example 2

Figure 8:
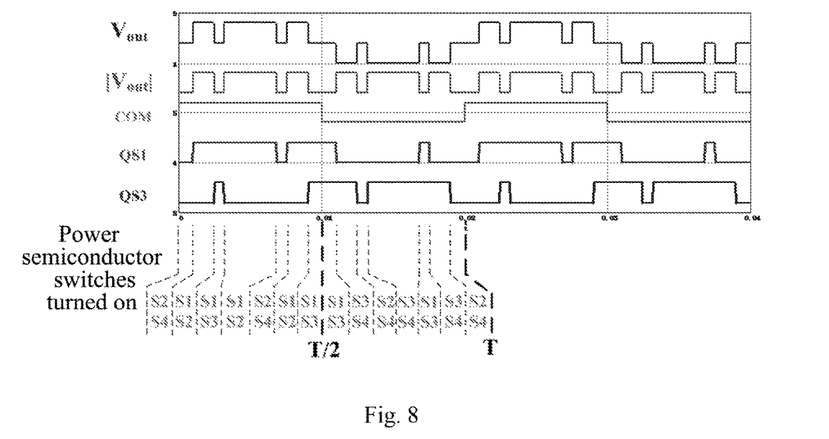
FIG. 8 is a second schematic diagram for turning on power semiconductor switches in an H-bridge circuit provided by the present application.
Figures 9A, 9B:
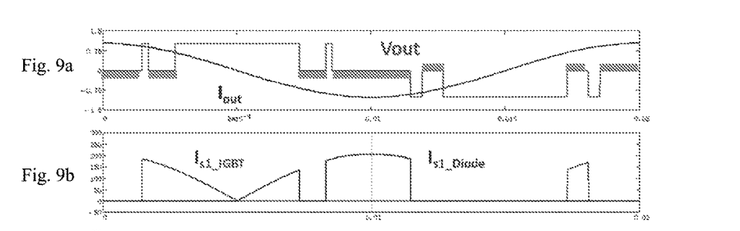
FIGS. 9a-9e are second schematic diagrams of current distribution of power semiconductor switches in an H-bridge circuit.
Figure 9C:
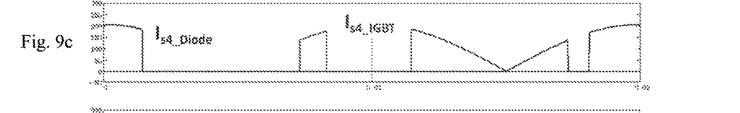
Figures 9D, 9E:
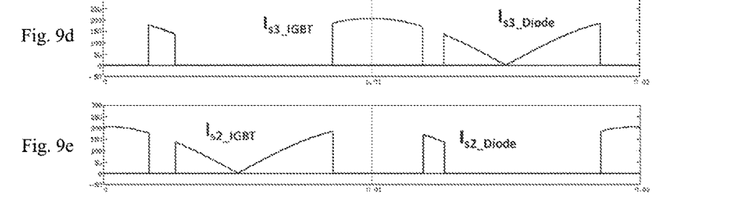

FIG. 8 is a second schematic diagram for turning on power semiconductor switches in an H-bridge circuit provided by the present application. As shown in FIG. 8, it is assumed that the control circuit 11 calculates the start time and the end time of the zero level of the output voltage Vout of each T/2 work cycle and determines, based on the start time and the end time, that each T/2 work cycle includes four zero level sections, namely an even number of zero level sections. In the present embodiment, Vout is the output voltage waveform of the H-bridge circuit, and |Vout| is the waveform of the absolute value of the output voltage of the H-bridge circuit. COM is the waveform of the polarity of the output voltage of the H-bridge circuit. When the polarity of the output voltage Vout of the H-bridge is positive, COM=1. When the polarity of the output voltage of the H bridge is negative, COM=0. QS1 is a control signal waveform of the upper power semiconductor switch S1 of the first bridge arm, and QS3 is a control signal waveform of the upper power semiconductor switch S3 of the second bridge arm, where a control signal waveform of the lower power semiconductor switch S4 of the first bridge arm is complementary to the control signal waveform of the upper power semiconductor switch S1 of the first bridge arm, and thus is omitted here; a control signal waveform of the lower power semiconductor switch S2 of the second bridge arm is complementary to the control signal waveform of the upper power semiconductor switch S3 of the second bridge arm, and thus is omitted here.

In the previous T/2 work cycle, the control circuit 11 can output the first control signal to the drive circuit 12 in the first zero level section, i.e., in the first zero level section of the output voltage Vout for enabling the drive circuit 12 to output the first driving signal to the upper power semiconductor switch S1 of the first bridge arm to drive the upper power semiconductor switch S1 of the first bridge arm to be off. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be on. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be off. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be on.

The control circuit 11 can output the first control signal to the drive circuit 12 in the second zero level section, i.e., in the second zero level section of the output voltage Vout for enabling the drive circuit 12 to output the first driving signal to the upper power semiconductor switch S1 of the first bridge arm to drive the upper power semiconductor switch S1 of the first bridge arm to be on. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be off. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be on. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be off. Use this analogy until the end of the previous T/2 work cycle.

In the posterior T/2 work cycle, the control circuit 11 can output the first control signal to the drive circuit 12 in the first zero level section, i.e., in the first zero level section of the output voltage Vout for enabling the drive circuit 12 to output the first driving signal to the upper power semiconductor switch S1 of the first bridge arm to drive the upper power semiconductor switch S1 of the first bridge arm to be on. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be off. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be on. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be off.

The control circuit 11 can output the first control signal to the drive circuit 12 in the second zero level section, i.e., in the second zero level section of the output voltage Vout for enabling the drive circuit 12 to output the first driving signal to the upper power semiconductor switch S1 of the first bridge arm to drive the upper power semiconductor switch S1 of the first bridge arm to be off. The control circuit 11 outputs the second control signal to the drive circuit 13 for enabling the drive circuit 13 to output the second driving signal to the lower power semiconductor switch S4 of the first bridge arm to drive the lower power semiconductor switch S4 of the first bridge arm to be on. The control circuit 11 outputs the third control signal to the drive circuit 14 for enabling the drive circuit 14 to output the third driving signal to the upper power semiconductor switch S3 of the second bridge arm to drive the upper power semiconductor switch S3 of the second bridge arm to be off. The control circuit 11 outputs the fourth control signal to the drive circuit 15 for enabling the drive circuit 15 to output the fourth driving signal to the lower power semiconductor switch S2 of the second bridge arm to drive the lower power semiconductor switch S2 of the second bridge arm to be on. Use this analogy until the end of the posterior T/2 work cycle.

In the above example, one-half work cycle contains an even number of zero level sections and the duration corresponding to respective zero level section is slightly different from each other, therefore, by means of exchanging the turning-on sequences of "the upper power semiconductor switch S1 of the first bridge arm and the upper power semiconductor switch S3 of the second bridge arm" and "the lower power semiconductor switch S4 of the first bridge arm and the lower power semiconductor switch S2 of the second bridge arm" in the previous T/2 work cycle and the posterior T/2 work cycle, the upper power semiconductor switch S1 of the first bridge arm and the upper power semiconductor switch S3 of the second bridge arm are turned on in the first zero level section within the previous T/2 work cycle and the lower power semiconductor switch S4 of the first bridge arm and the lower power semiconductor switch S2 of the second bridge arm are turned on in the first zero level section within the posterior T/2 work cycle; or the lower power semiconductor switch S4 of the first bridge arm and the lower power semiconductor switch S2 of the second bridge arm are turned on in the first zero level section within the previous T/2 work cycle and the upper power semiconductor switch S1 of the first bridge arm and the upper power semiconductor switch S3 of the second bridge arm are turned on in the first zero level section within the posterior T/2 work cycle. In this way, the total duration in which the power semiconductor switch S1 and the power semiconductor switch S3 are turned on is consistent with the total duration in which the power semiconductor switch S2 and the power semiconductor switch S4 are turned on in the whole work cycle, so that the losses of the upper power semiconductor switch and the lower power semiconductor switch in the same bridge arm are the same or approximately the same, and thus the useful lifetime of the H-bridge circuit is increased.

FIGS. 9a-9e are second schematic diagrams of current distribution of power semiconductor switches in an H-bridge circuit. As shown in FIGS. 9a-9e, the IGBT/Diode current waveforms of the power semiconductor switches in the H-bridge circuit (taking outputted base frequency sinusoidal current as an example) in the case that the driving method shown in FIG. 8 is used to drive the upper power semiconductor switch S1 of the first bridge arm and the upper power semiconductor switch S3 of the second bridge arm and the lower power semiconductor switch S4 of the first bridge arm and the lower power semiconductor switch S2 of the second bridge arm to be on alternately in the whole work cycle are shown. According to a comparison, the IGBT/Diode current waveform of the upper power semiconductor switch S1 of the first bridge arm (i.e., shown in FIG. 9b) approximately coincides with the IGBT/Diode current waveform of the lower power semiconductor switch S4 (i.e., shown in FIG. 9c) after delaying one-half work cycle, which indicates that the turning-on losses of the upper power semiconductor switch S1 and the lower power semiconductor switch S4 are approximately the same. At the same time, the IGBT/Diode switching time current of the upper power semiconductor switch S1 of the first bridge arm is equal to the IGBT/Diode switching time current of the lower power semiconductor switch S4 after one-half work cycle, which indicates that the switching losses are approximately the same. Accordingly, the IGBT/Diode current waveform of the upper power semiconductor switch S3 of the second bridge arm (i.e., shown in FIG. 9d) approximately coincides with the IGBT/Diode current waveform of the lower power semiconductor switch S2 (i.e., shown in FIG. 9e) after delaying one-half work cycle, which indicates that the turning-on losses of the upper power semiconductor switch S3 and the lower power semiconductor switch S2 are approximately the same. At the same time, the IGBT/Diode switching time current of the upper power semiconductor switch S3 of the second bridge arm is equal to the IGBT/Diode switching time current of the lower power semiconductor switch S2 after one-half work cycle, which indicates that the switching losses are approximately the same.

Therefore, the upper power semiconductor switch S1 of the first bridge arm and the upper power semiconductor switch S3 of the second bridge arm are turned on alternately with the lower power semiconductor switch S4 of the first bridge arm and the lower power semiconductor switch S2 of the second bridge arm in the H-bridge circuit in any two adjacent preset durations. The total duration in which the upper power semiconductor switch S1 of the first bridge arm and the upper power semiconductor switch S3 of the second bridge arm are turned on is consistent with the total duration in which the lower power semiconductor switch S4 of the first bridge arm and the lower power semiconductor switch S2 of the second bridge arm are turned on in two adjacent preset durations, so that the losses of the upper power semiconductor switch and the lower power semiconductor switch in the same bridge arm are the same or approximately the same, and thus the useful lifetime of the H-bridge circuit is increased.

It will be understood by those ordinary skilled in the art that all or a portion of the steps for implementing the above-mentioned method embodiments may be accomplished by a hardware associated with program instructions. The above-mentioned program may be stored in a control circuit. When the program is executed, steps in the above-mentioned method embodiments are executed; and the above-mentioned control circuit includes: a ROM, a RAM, a magnetic disk, or an optical disk or the like, each of which can be a medium storing a program code.

Finally, it should be noted that the above embodiments are merely used to illustrate the technical solutions of the present application and are not intended to limit them. While the present application has been described in detail with reference to the above-mentioned embodiments, those skilled in the art will understand that modifications can still made to the technical solutions recited in the above-mentioned embodiments, or equivalently substitutions can be made to some or all of the technical features therein. However, these modifications or substitutions do not depart the corresponding technical solutions from the scope of the technical solutions of the embodiments of the present application.

What is claimed is:

1. A driving method for power semiconductor switches in an H-bridge circuit, wherein the H bridge circuit comprises a first bridge arm, a second bridge arm and a bus capacitor, both the first bridge arm and the second bridge arm are connected to the bus capacitor in parallel, wherein each of the first bridge arm and the second bridge arm comprises an upper power semiconductor switch and a lower power semiconductor switch, an output voltage is generated between a connection point connecting the upper power semiconductor switch with the lower power semiconductor switch in the first bridge arm and a connection point connecting the upper power semiconductor switch with the lower power semiconductor switch in the second bridge arm; the driving method comprises:

calculating, by a control circuit of the H-bridge circuit, a start time and an end time, determining, by the control circuit, zero level sections based on the start time and the end time, and outputting, by the control circuit, a control signal in the zero level sections, wherein the start time is a time at which the output voltage changes from a non-zero level to a zero level, the end time is a time at which the output voltage changes from the zero level to the non-zero level, and the zero level sections are durations in which the output voltage is the zero level;

receiving, by a drive circuit of the H-bridge circuit, the control signal, and outputting, by the drive circuit, a driving signal to drive the upper power semiconductor switch of the first bridge arm and the upper power semiconductor switch of the second bridge arm to be on simultaneously or driving the lower power semiconductor switch of the first bridge arm and the lower power semiconductor switch of the second bridge arm to be on simultaneously in the zero level sections;

wherein each of a first preset duration and a second preset duration comprised in a duration of the output voltage of the H-bridge circuit comprises at least one of the zero level sections; the upper power semiconductor switch of the first bridge arm and the upper power semiconductor switch of the second bridge arm and the lower power semiconductor switch of the first bridge arm and the lower power semiconductor switch of the second bridge arm are turned on with a first turning-on logic sequence in the at least one zero level section within the first preset duration; and the upper power semiconductor switch of the first bridge arm and the upper power semiconductor switch of the second bridge arm and the lower power semiconductor switch of the first bridge arm and the lower power semiconductor switch of the second bridge arm are turned on with a second turning-on logic sequence in the at least one zero level section within the second preset duration.

2. The driving method according to claim 1, wherein the first turning-on logic sequence is different from the second turning-on logic sequence.

3. The driving method according to claim 1, wherein the first preset duration is N times one-half work cycle of the H-bridge circuit, wherein N≥1, and N is a natural number.

4. The driving method according to claim 3, wherein a time length of the second preset duration is the same as or different from a time length of the first preset duration, and the second preset duration and the first preset duration are two durations adjacent in time.

5. The driving method according to claim 1, wherein when the first preset duration and the second preset duration each comprise one of the zero level sections, the first turning-on logic sequence is that the upper power semiconductor switch of the first bridge arm and the upper power semiconductor switch of the second bridge arm are turned on simultaneously in the one zero level section within the first preset duration, and the second turning-on logic sequence is that the lower power semiconductor switch of the first bridge arm and the lower power semiconductor switch of the second bridge arm are turned on simultaneously in the one zero level section within the second preset duration.

6. The driving method according to claim 1, wherein when the first preset duration and the second preset duration each comprise one of the zero level sections, the first turning-on logic sequence is that the lower power semiconductor switch of the first bridge arm and the lower power semiconductor switch of the second bridge arm are turned on simultaneously in the one zero level section within the first preset duration, and the second turning-on logic sequence is that the upper power semiconductor switch of the first bridge arm and the upper power semiconductor switch of the second bridge arm are turned on simultaneously in the one zero level section within the second preset duration.

7. The driving method according to claim 1, wherein when the first preset duration and the second preset duration each comprise two or more of the zero level sections, the first turning-on logic sequence is that simultaneous turning-on of the upper power semiconductor switch of the first bridge arm and the upper power semiconductor switch of the second bridge arm and simultaneous turning-on of the lower power semiconductor switch of the first bridge arm and the lower power semiconductor switch of the second bridge arm are performed alternately in the two or more zero level sections within the first preset duration; and the second turning-on logic sequence is that the simultaneous turning-on of the lower power semiconductor switch of the first bridge arm and the lower power semiconductor switch of the second bridge arm and the simultaneous turning-on of the upper power semiconductor switch of the first bridge arm and the upper power semiconductor switch of the second bridge arm are performed alternately in the two or more zero level sections within the second preset duration.

8. The driving method according to claim 1, wherein when the first preset duration and the second preset duration each comprise two or more of the zero level sections, the first turning-on logic sequence is that simultaneous turning-on of the lower power semiconductor switch of the first bridge arm and the lower power semiconductor switch of the second bridge arm and simultaneous turning-on of the upper power semiconductor switch of the first bridge arm and the upper power semiconductor switch of the second bridge arm are performed alternately in the two or more zero level sections within the first preset duration; and the second turning-on logic sequence is that the simultaneous turning-on of the upper power semiconductor switch of the first bridge arm and the upper power semiconductor switch of the second bridge arm and the simultaneous turning-on of the lower power semiconductor switch of the first bridge arm and the lower power semiconductor switch of the second bridge arm are performed alternately in the two or more zero level sections within the second preset duration.

9. The driving method according to claim 1, wherein when the first preset duration and the second preset duration each comprise two or more of the zero level sections, the first turning-on logic sequence is that the upper power semiconductor switch of the first bridge arm and the upper power semiconductor switch of the second bridge arm are turned on simultaneously in each of the two or more zero level sections within the first preset duration; and the second turning-on logic sequence is that the lower power semiconductor switch of the first bridge arm and the lower power semiconductor switch of the second bridge arm are turned on simultaneously in each of the two or more zero level sections within the second preset duration.

10. The driving method according to claim 1, wherein when the first preset duration and the second preset duration each comprise two or more of the zero level sections, the first turning-on logic sequence is that the lower power semiconductor switch of the first bridge arm and the lower power semiconductor switch of the second bridge arm are turned on simultaneously in each of the two or more zero level sections within the first preset duration; and the second turning-on logic sequence is that the upper power semiconductor switch of the first bridge arm and the upper power semiconductor switch of the second bridge arm are turned on simultaneously in each of the two or more zero level sections within the second preset duration.

11. The driving method according to claim 1, wherein the H-bridge circuit comprises a plurality of drive circuits;

the control signal comprises a first control signal, a second control signal, a third control signal and a fourth control signal; and the driving signal comprises a first driving signal, a second driving signal, a third driving signal and a fourth driving signal;

wherein the first driving signal is used to drive the upper power semiconductor switch of the first bridge arm to be on or off, the second driving signal is used to drive the lower power semiconductor switch of the second bridge arm to be on or off, the third driving signal is used to drive the upper power semiconductor switch of the second bridge arm to be on or off, and the fourth driving signal is used to drive the lower power semiconductor switch of the first bridge arm to be on or off.

* * * * *